US012629865B2

(12) United States Patent
Batty

(10) Patent No.: US 12,629,865 B2
(45) Date of Patent: May 19, 2026

(54) MODULAR VACUUM PRESS FOR PRODUCING CONTOURED ARTICLES USING WOOD LAMINAE AND METHOD OF COMPRESSING WOOD LAMINAE TO PRODUCE A CONTOURED ARTICLE

(71) Applicant: Ronald J. Batty, Perth (CA)

(72) Inventor: Ronald J. Batty, Perth (CA)

( * ) Notice: Subject to any disclaimer, the term of this patent is extended or adjusted under 35 U.S.C. 154(b) by 100 days.

(21) Appl. No.: 18/403,109

(22) Filed: Jan. 3, 2024

(65) Prior Publication Data

US 2025/0214279 A1 Jul. 3, 2025

(51) Int. Cl.
*B27N 5/00* (2006.01)

(52) U.S. Cl.
CPC .................................... *B27N 5/00* (2013.01)

(58) Field of Classification Search
CPC ............... B27N 5/00; B27N 1/00; B27N 3/18
See application file for complete search history.

(56) References Cited

U.S. PATENT DOCUMENTS

| | | | |
|---|---|---|---|
| 4,052,241 | A | 10/1977 | Walter |
| 4,379,101 | A | 4/1983 | Smith |
| 4,469,655 | A | 9/1984 | Kiss |
| 4,517,147 | A | 5/1985 | Taylor et al. |
| 4,790,966 | A | 12/1988 | Sandberg et al. |
| 5,198,236 | A | 3/1993 | Gunderson et al. |
| 6,103,180 | A | 8/2000 | Haeseker et al. |
| 2003/0180506 | A1 | 9/2003 | Haataja |
| 2008/0197536 | A1 | 8/2008 | Fujii |

FOREIGN PATENT DOCUMENTS

| | | | | |
|---|---|---|---|---|
| CN | 110815486 A * | 2/2020 | | B27N 3/08 |
| WO | WO8801565 A1 | 3/1988 | | |

* cited by examiner

*Primary Examiner* — S. Behrooz Ghorishi
(74) *Attorney, Agent, or Firm* — JK Intellectual Property Law, PA

(57) ABSTRACT

A modular vacuum press adapted to produce contoured articles with a consistent thickness and strength includes a central robot arm that manipulates a vacuum press die to load a perforated top surface of the die with a laminae mat at a wood laminae loading station, unload lose wood laminae from the top surface, move the die to a low-pressure press that compresses the mat into a cohesive article and move the cohesive article to a high-pressure press for compression into the contoured article.

16 Claims, 8 Drawing Sheets

MODULAR VACUUM PRESS FOR PRODUCING CONTOURED ARTICLES USING WOOD LAMINAE AND METHOD OF COMPRESSING WOOD LAMINAE TO PRODUCE A CONTOURED ARTICLE

RELATED APPLICATIONS

This is the first application filed for this invention.

FIELD OF THE INVENTION

This invention relates in general to producing contoured articles using wood laminae and, in particular, to a modular vacuum press configured to produce contoured articles using wood laminae and a method of compressing wood laminae to produce a contoured article.

BACKGROUND OF THE INVENTION

There is a long history of producing composite wood panels and structural members from wood chips, flakes, and particles. Processes are also well known for producing flat panels, corrugated panels and articles having contoured shapes from wood slurries, fibrous mats, and other fibrous compositions.

However, producing contoured articles from wood chips or flakes mixed with one or more adhesive compounds presents novel challenges that are not readily overcome. It is difficult to evenly distribute and retain a layer of wood chips or flakes on a contoured surface to permit an article with consistent thickness and strength to be compressed into a contoured shape. The wood chips or flakes tend to slide off high points or bends in the contoured surface and accumulate in low areas and depressions. Furthermore, wood chips and flakes are stiff and generally fragile. Consequently, if bent at sharp angles they are likely to fracture or tear, which compromises the strength and appearance of a contoured article.

Applicant improved the process of producing flat panels and structural members using wood unsuitable for structural lumber by inventing a process for cutting wood laminae and forming same into flat and corrugated panels, as described in Applicant's U.S. Pat. No. 10,723,039 which issued on Jul. 28, 2020, the specification of which is incorporated herein by reference. Wood laminae are thin pliable wood flakes cut and sorted to exacting specifications. The wood laminae are cut from wood using a proprietary cutter geometry and specific wood orientation with respect to the cutter as described in detail in Applicant's above-identified United States patent.

However, there remains a need for a method and press arrangement for producing contoured articles with consistent thickness and structural strength.

SUMMARY OF THE INVENTION

It is therefore an object of the invention to provide a method and modular vacuum press arrangement for producing contoured articles having consistent thickness and structural strength.

The invention therefore provides a modular vacuum press arrangement for producing contoured articles having consistent thickness and structural strength.

The invention further provides a method of compressing wood laminae mixed with one or more adhesives into contoured articles having a consistent thickness and structural strength.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a novel modular vacuum press for producing contoured articles from wood laminae cut and sorted to exacting specifications and mixed with one or more wood adhesives for bonding the wood laminae in a desired contoured shape. For the purposes of the invention, the wood laminae are preferably cut and sorted to be within a size range of 2 cm-4 cm (0.79"-1.58") in length and 0.127 mm-0.254 mm (0.005"-0.010") in thickness. The average length and thickness of the laminae selected is dependent principally on a shape of the article being produced. In general, if an angular bend is required in the contoured article, shorter and thinner laminae within the specified range perform best. It should be understood, however, that for molded articles with gentle curves, the specified range of laminae length and thickness may be increased up to twice the preferred dimensions of length and thickness without departing from the scope or spirit of the invention. Methods of cutting and sorting the required wood laminae within the specified range are described in detail in Applicant's above-identified United States patent. Examples of adhesives and adhesive combinations suitable for mixing with the wood laminae to bind the wood laminae into a desired contoured shape are described in detail in Applicant's United States patent application published on Aug. 4, 2022, under publication number US/220242007A1, the specification of which is incorporated herein by reference.

Figure 1:
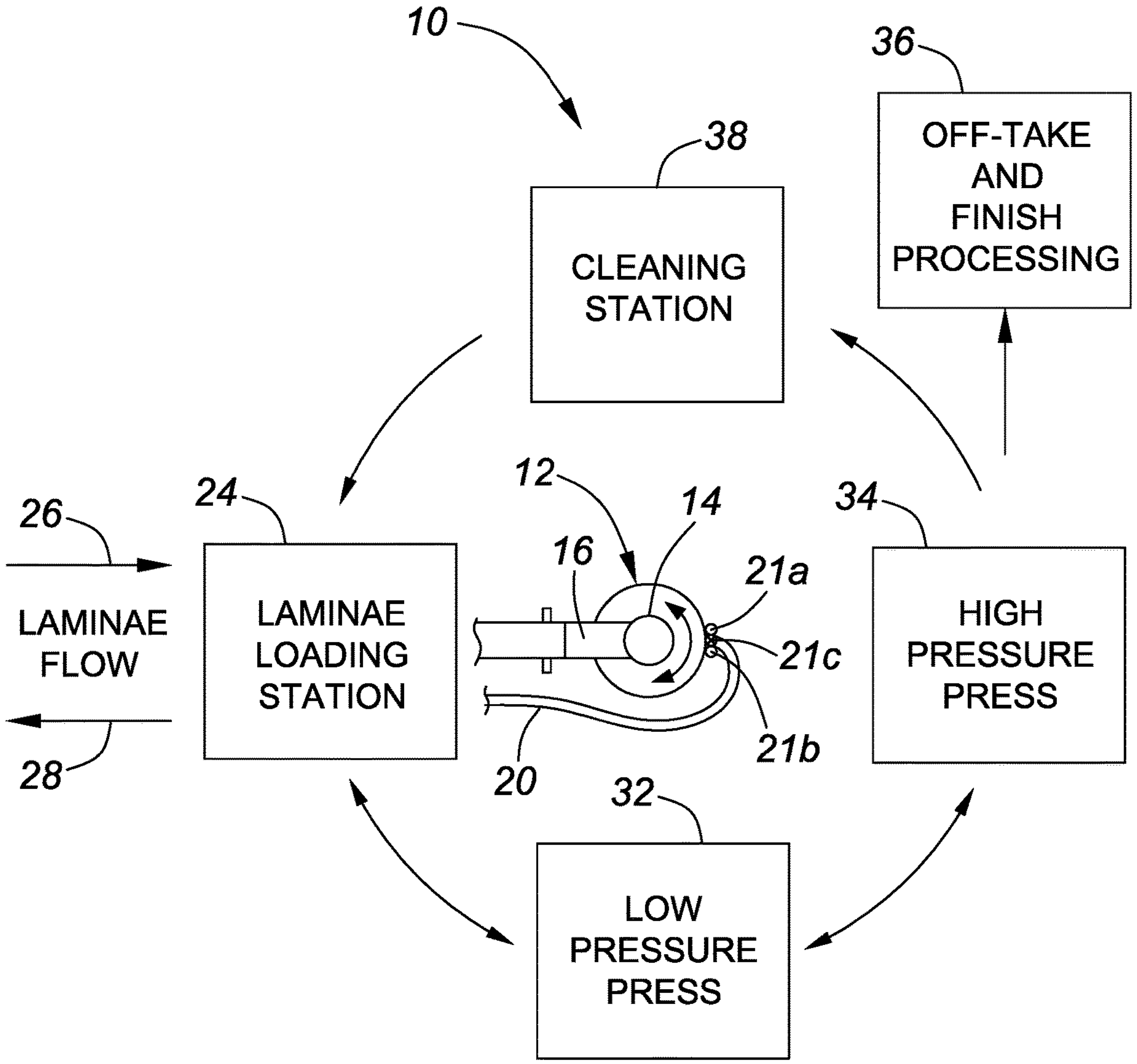
FIG. 1 is a block diagram of a modular vacuum press for producing contoured articles from wood laminae in accordance with the invention.

FIG. 1 is a block diagram of a modular vacuum press 10 for producing contoured articles from wood laminae in accordance with the invention. The modular vacuum press 10 includes a software-controlled central robot arm 12 equipped with a pedestal 14 having a first axis with 360° rotation. In one embodiment, the pedestal 14 supports an articulated arm 16 with second, third, fourth and fifth axes of rotation in a manner known in the art. The articulated arm 16 is equipped on a free end with a hollow vacuum press die coupling 18 (see FIG. 2) adapted to be selectively coupled in fluid communication with a hollow vacuum press die 22 having a perforated top surface 23*a* (see FIG. 2) and decoupled therefrom under control of the central robot arm 12. The vacuum press die coupling 18 is provided with at least one hose coupling to which is connected at least one vacuum/air-pressure supply hose 20 that is in fluid communication with the vacuum press die 22 when the articulated arm 16 is coupled to the vacuum press die 22. In one embodiment the vacuum/air-pressure supply hose 20 is connected to both a vacuum source 21*a* and an air-pressure source 21*b* via a three-way valve 21*c* that is selectively switched under the control of the central robot arm 12 from the vacuum source 21*a* to the air-pressure source 21*b* or to atmosphere when neither vacuum nor air pressure is required. In an alternate embodiment, a vacuum supply hose is connected to the vacuum press die coupling 18 and a vacuum source (not shown), and an air-pressure supply hose is connected to the vacuum press die coupling 18 and an air-pressure source (not shown). The vacuum press die coupling 18 can be rotated at least 270° by the fifth axis of rotation of the articulated arm 16. The purpose of that rotation will be explained below with reference to FIGS. 4 and 5A-5C.

Dried wood laminae are supplied from a dried wood laminae source such as a blender (not shown), which is well known in the art for use in mixing one or more adhesives with dry wood laminae before the wood laminae are delivered to the modular vacuum press 10. Depending on the adhesive or adhesive blend used, the wood laminae may require further drying after they are mixed with the adhesive (s) to avoid undesirable clogging of the apertures in the perforated top surface 23*a* of the vacuum press die 22, as well as premature setting of the adhesive(s). For example, if MDI (Methylenediphenyl Diisocyanate) is used alone or in combination with another adhesive, it is preferable that the dried wood laminae supplied from the blender to the laminae loading station 24 have a moisture content that does not exceed 6% by weight.

A predetermined volume of the dried laminae is supplied to the laminae loading station 24 via a laminae inflow 26, as will be explained below with reference to FIGS. 2-4, when the central robot arm 12 moves the vacuum press die 22 to the laminae loading station 24. A laminae mat 30 (see FIG. 4) of the dried laminae clings to the perforated top surface 23*a* of the vacuum press die 22 when suction is generated by vacuum supplied via the vacuum/air-pressure supply hose 20. A strength of the suction force determines a thickness of the mat 30, up to a limit at which the suction force at an outer surface of the laminae mat 30 is insufficient to bind more laminae. Excess laminae are returned to the laminae source via a laminae return flow 28, as will be explained below with reference to FIGS. 3 and 4.

A heated low-pressure press 32 compresses the laminae mat 30 on the vacuum press die 22 to consolidate the laminae mat 30 into a cohesive article 35 (see FIG. 2) that is transferred by the central robot arm 12 using the vacuum press die 22 from the low-pressure press 32 to a heated high-pressure press 34. The cohesive article 35 is released from the vacuum press die 22 and deposited into the high-pressure press 34 by switching from vacuum source 21*a* to air-pressure source 21*b* in the vacuum/air-pressure supply hose 20. The robot arm 12 then returns the vacuum press die 22 to the laminae loading station 24 to be loaded for another press cycle. Meanwhile, the heated high-pressure press 34 heats and compresses the cohesive article 35 into a contoured article 94 (see FIG. 6) of a desired density that is removed from the high-pressure press 34 by off-take and finish processing 36, as will be explained below in more detail with reference to FIG. 6.

After a predetermined number of press cycles, or in response to a perforation occlusion test conducted to determine to what extent perforations in the top surface 23*a* of the vacuum press die 22 are occluded by adhesive residue, the vacuum press die 22 is moved from the high-pressure press 34 to a die cleaning station 38, the function of which will be explained in detail with reference to FIGS. 5A-5C. An exemplary perforation occlusion test can be performed, for example, by measuring back-pressure when air pressure source 21*b* is applied to the vacuum/air-pressure supply hose 20 after a cohesive article 35 has been deposited into the high-pressure press 34.

Figure 2:
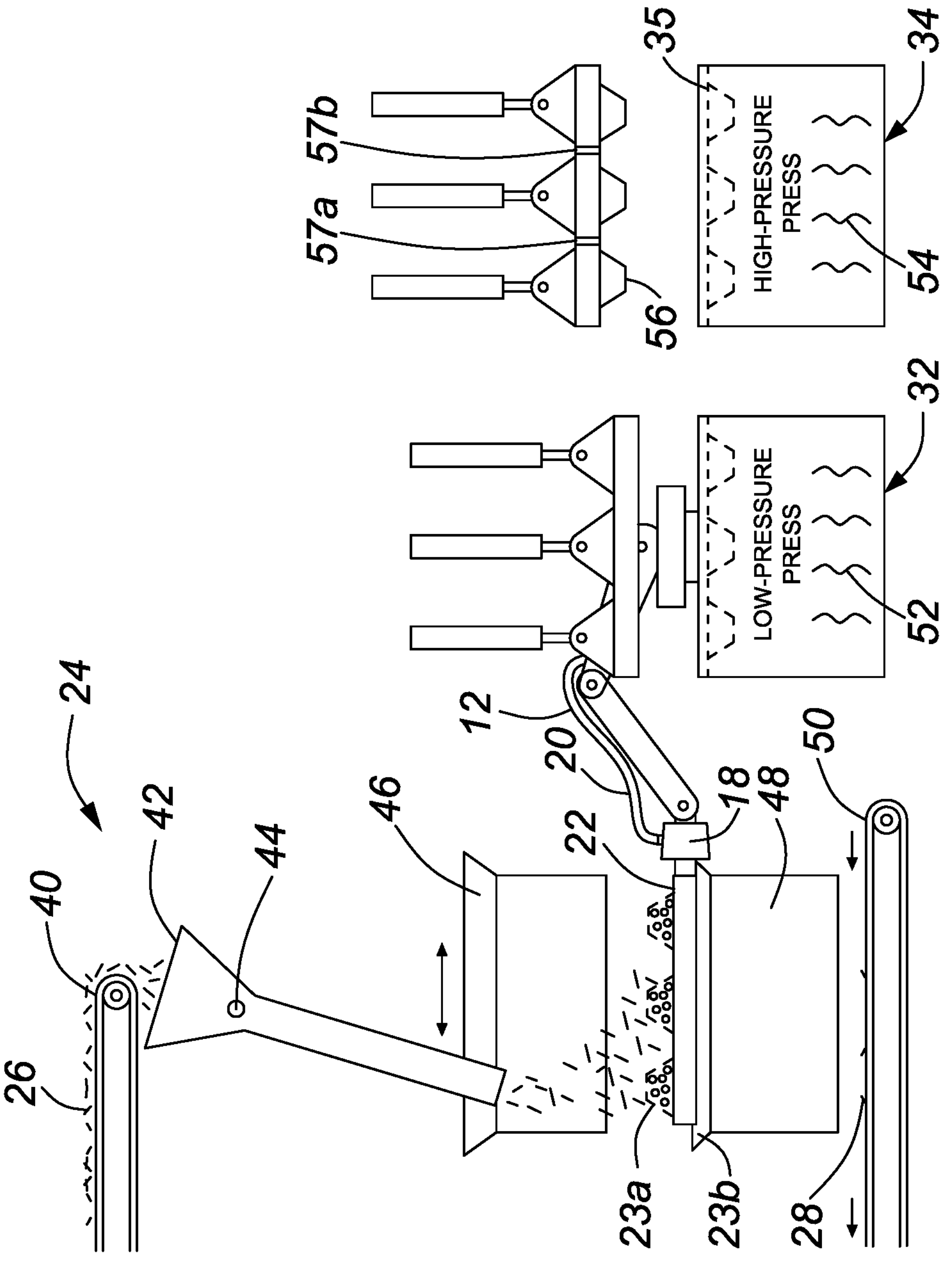
FIG. 2 is a schematic side view of a laminae loading station and press sections of the modular vacuum press shown in FIG. 1.

FIG. 2 is a schematic side view of a laminae loading station 24 and press sections 32, 34 of the modular vacuum press 10 shown in FIG. 1. As described above, a laminae inflow 26 delivers a predetermined volume of wood laminae from a wood laminae source via a laminae supply conveyor 40 when the central robot arm 12 moves the vacuum press die 22 into the laminae loading station 24. The laminae supply conveyor 40 drops the laminae inflow 26 into an oscillating laminae distributor chute 42. The oscillating laminae distributor chute 42 oscillates on a distributor chute pivot drive 44, to distribute the laminae inflow 26 across the perforated top surface 23*a* of the vacuum press die 22. The perforated top surface 23*a* of the vacuum press die 22 is perforated by a plurality of closely spaced small apertures wherever laminae are to be accumulated to produce a desired contoured article(s) 94. A bottom surface 23*b* of the vacuum press die 22 is not perforated. In the example shown, the vacuum press die 22 is for producing contoured wood pallets, and the perforations cover the entire perforated top surface 23*a* of the vacuum press die 22. A distributor hood 46 contains and directs the laminae flow 26 onto the perforated top surface 23*a* of the vacuum press die 22. A return flow hood 48 directs laminae that bypass the vacuum press die 22 onto a laminae return conveyor 50, which carries the laminae return flow 28 back to the laminae source. After the predetermined volume of wood laminae has been loaded onto the vacuum-press die 22 a laminae mat 30 (see FIG. 4) is adhered to the perforated top surface 23*a* of the vacuum press die 22 by the suction force generated by the vacuum applied by the central robot arm 12. The vacuum press die 22 is then inverted by the central robot arm 12 and moved to the low-pressure press 32, as will be explained in more detail below with reference to FIGS. 3 and 4.

The low-pressure press 32 has a heat source 52 that serves to maintain the press surfaces at a predetermined target temperature. When the central robot arm 12 moves the vacuum press die 22 to the low-pressure press 32, the low-pressure press applies a compressive force to the bottom surface 23*b* of the inverted vacuum press die 22. The compressive force, at the predetermined target temperature, is adequate to transform the laminae mat 30 into a cohesive article 35. The compressive force and the predetermined target temperature are dependent on the type of adhesive(s) used, as explained in Applicant's above-identified published patent application. A dwell time in the low-pressure press 32 is dependent on a thickness of the laminae mat 30. As understood by those skilled in the art, the perforated top surface 23*a* of the vacuum press die 22 is reinforced as required to prevent deflection during the low-pressure press cycle.

The high-pressure press 34 likewise has a heat source 54 that serves to maintain the press surfaces at a predetermined target temperature required to thermally set the laminae mat 30 into a permanently bonded contoured article 94 when the high-pressure press compresses the cohesive article 35 at a predetermined compressive force. The predetermined target temperature of the high-pressure press 34 is also dependent on the type of adhesive(s) being used, as explained in Applicant's above-identified published patent application. The high-pressure press 34 has a male press section 56 that has the same shape and configuration as the perforated top surface 23*a* of the vacuum press die 22, except that the male press section 56 is a solid contoured surface, apart from any vent passages (57*a*, 57*b*, for example) required to permit steam to escape from the cohesive article 35 during the high-pressure compression cycle to avoid moisture-induced blistering in the contoured article 94. When the central robot arm 12 moves to the high-pressure press 34, it switches the vacuum/air-pressure supply hose 20 from vacuum 21*a* to air pressure 21*b* to release the cohesive article 35 into the high-pressure press 34. After the central robot arm 12 withdraws the vacuum press die 22 from the high-pressure press 34, the high-pressure press cycle begins.

Figure 3:
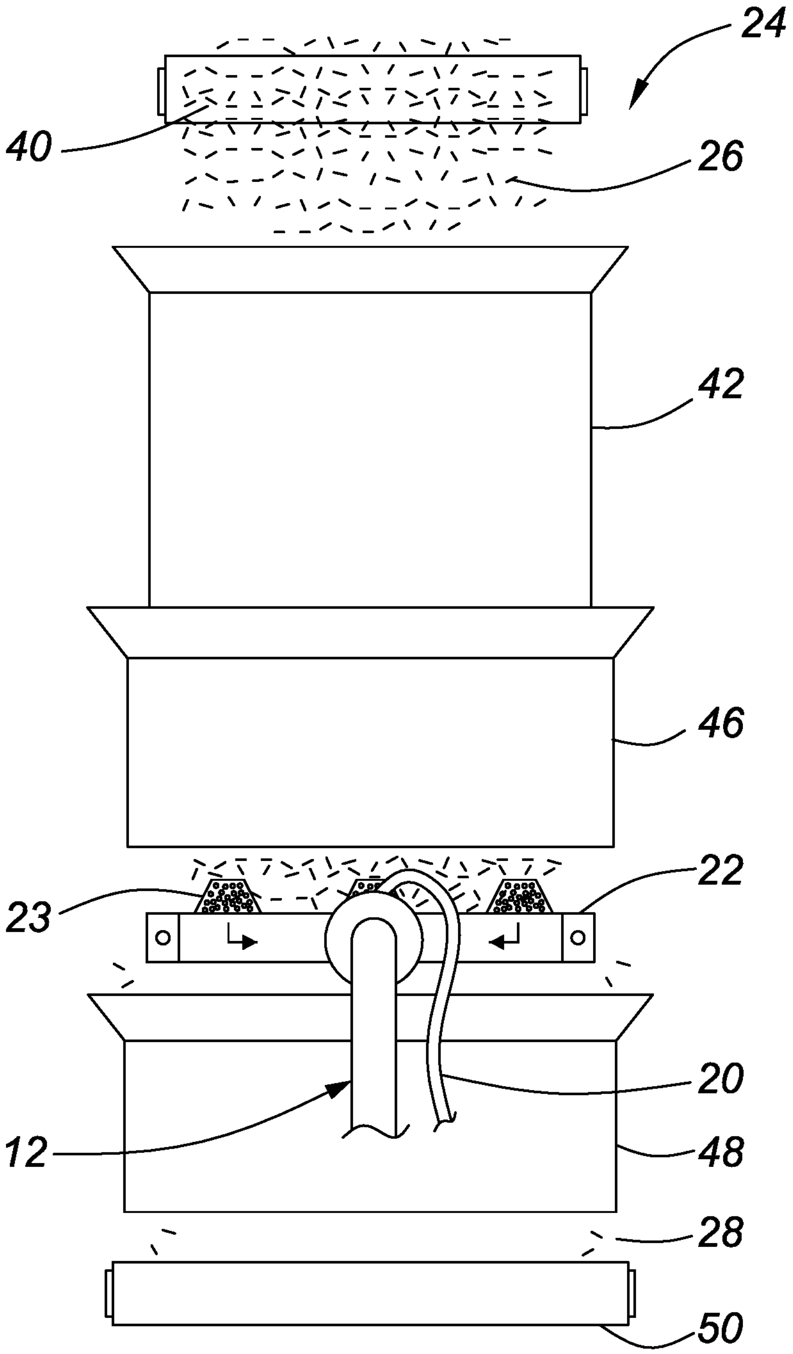
FIG. 3 is a schematic end view of the laminae loading station shown in FIG. 1, illustrating a vacuum press die being loaded with dry wood laminae.

FIG. 3 is a schematic end view of the laminae loading station 24 shown in FIG. 1, illustrating the vacuum press die 22 being loaded with dry laminae mixed with one or more adhesives. As described above, the dry laminae inflow 26 is directed by the oscillating laminae distributor chute 42 across the perforated top surface 23*a* of the vacuum press die 22. Any laminae that fall around the edges of the vacuum press die 22 are directed by the return flow hood 48 onto a laminae return conveyor 50 and returned to the laminae source. While the laminae are being loaded by the laminae loading station 24, the vacuum/air-pressure supply hose 20 is connected to the vacuum source 21*a* so laminae falling on the perforated top surface 23*a* of the vacuum press die 22 cling to the perforated top surface 23*a* until a laminae mat 30 (see FIG. 4) of sufficient thickness is accumulated that the strength of the vacuum force at an outer surface of the laminae mat 30 becomes inadequate to attract more laminae. The vacuum force applied to the vacuum press die 22 determines a thickness of the accumulated laminae mat 30 and can be adjusted within a limit of the vacuum source to achieve a desired thickness of the laminae mat 30 and hence a thickness of the finished contoured article 94.

Figure 4:
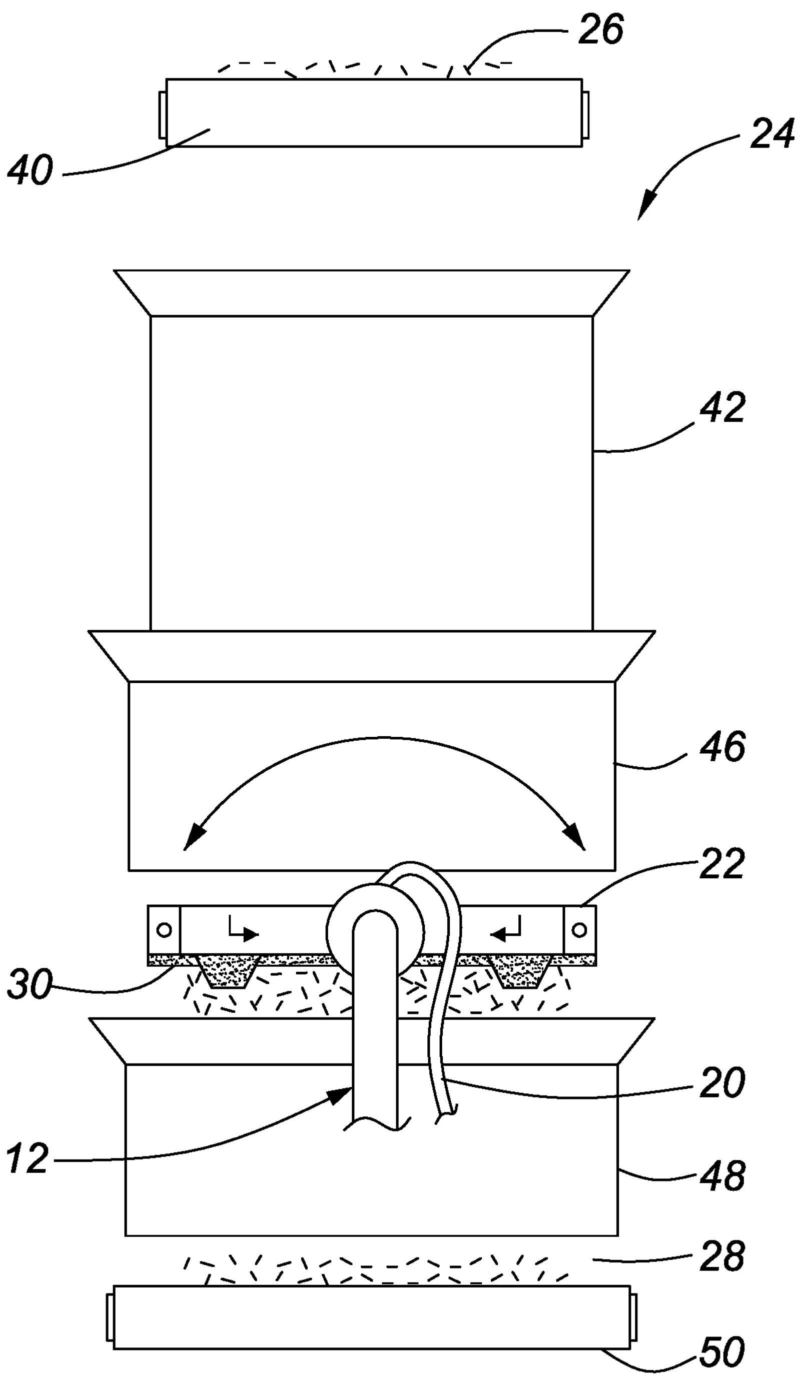
FIG. 4 is a schematic end view of the laminae loading station shown in FIG. 3, illustrating the vacuum press die inverted to unload excess wood laminae prior to placing the vacuum press die in a low-pressure press.

FIG. 4 is a schematic end view of the laminae loading station 24 shown in FIG. 3, illustrating the vacuum press die 22 inverted to unload lose laminae lying on top of the laminae mat 30 prior to pressing the laminae mat 30 in the low-pressure press 32. After the predetermined volume of wood laminae are loaded onto the perforated top surface 23*a* of the vacuum press die 22, the laminae supply conveyor 40 is halted to stop laminae inflow 26. After a brief period to ensure that all laminae have dropped as far as the perforated top surface 23*a* of the vacuum press die 22 the central robot arm 12 rotates the vacuum press die 22 counterclockwise 180 degrees to unload any lose laminae from the top of the laminae mat 30. The excess laminae are directed by the return flow hood 48 to the laminae return conveyor 50 and returned to an adhesive-mixed laminae source (not shown). The laminae mat 30 on the inverted perforated top surface 23*a* of the vacuum press die 22 continues to cling to the perforated top surface 23*a* because the vacuum source 21*a* is continuously applied by the vacuum/air-pressure supply hose 20 until the inverted vacuum press die 22 is moved by the central robot arm 12 and seated in the low-pressure press 32. After the vacuum press die 22 is seated in the low-pressure press 32, the vacuum/air-pressure supply hose 20 is switched to atmospheric pressure to inhibit intrusion of adhesive residue into the perforations in the perforated top surface 23*a* of the vacuum press die 22 while the laminae mat 30 is heated and compressed by the low-pressure press 32 into the cohesive article 35. After the low-pressure press cycle is completed, the vacuum force is re-applied by the central robot arm 12 to move the contoured article 94 to the high-pressure press 34.

Figure 5A:
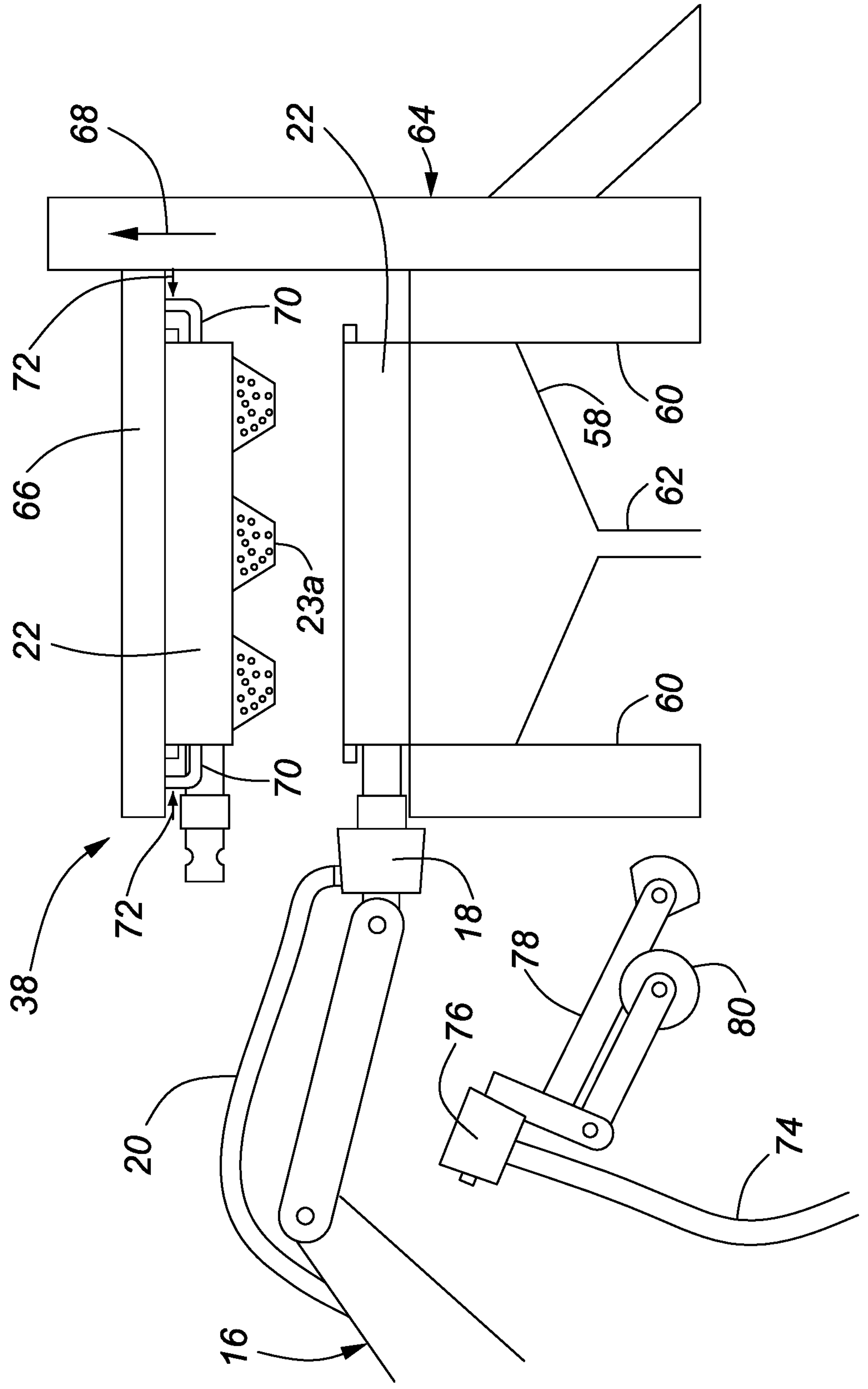
FIG. 5A is a schematic side view of a cleaning station shown in FIG. 1 and the robot arm placing a vacuum press die on the cleaning station.

FIG. 5A is a schematic side view of one embodiment of the die cleaning station 38 shown in FIG. 1 and the central robot arm 12 placing a vacuum press die 22 on the die cleaning station 38. The die cleaning station 38 includes a cleaning basin 58 having a top surface adapted to support the vacuum press die 22 in an inverted orientation to permit adhesive residue and the like to be removed from the perforations in the inverted perforated top surface 23*a* of the vacuum press die 22. The cleaning basin is supported by support legs 60. Connected to the rear support legs 60 is a clean die storage rack 64 that supports one or more clean die support arm(s) 66 adapted to support a cleaned vacuum press die 22 pending pickup by the central robot arm 12. A clean die lift drive 68 moves the clean die support arm 66 from a clean die pickup position to the clean die storage position. Clean die grippers 70 are moved from a die gripping position to a die release position by clean die gripper drives 72.

Figure 5B:
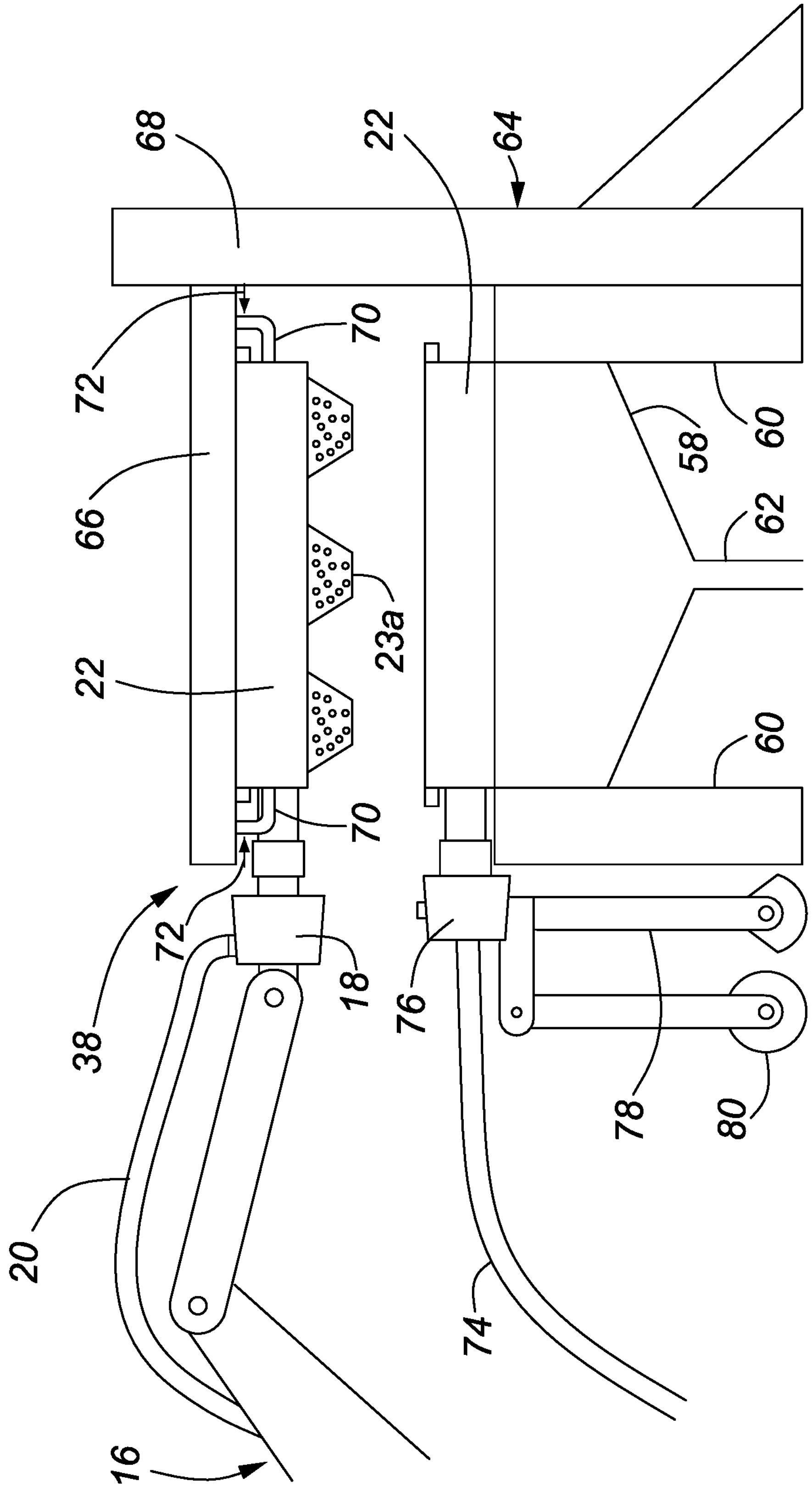
FIG. 5B is a schematic side view of the cleaning station shown in FIG. 1 and the robot arm picking up a clean vacuum press die from the cleaning station.

After the central robot arm 12 deposits the vacuum press die 22 on the top surface of the cleaning basin 58, the vacuum press die coupling 18 is rotated clockwise a quarter turn (90 degrees) to release the coupling from the vacuum press die 22, and the central robot arm 12 moves the articulated arm 16 up to pick up the cleaned vacuum press die 22 being supported by the clean die support arm 66 (see FIG. 5B). Meanwhile, a cleaning fluid supply head 76 is moved by a cleaning fluid supply decoupler 78 by a cleaning fluid supply decoupler drive 80 from a rest position to a cleaning position in which the cleaning fluid supply head 76 is connected to the vacuum press die 22 (see FIG. 5B).

FIG. 5B is a schematic side view of the cleaning station shown in FIG. 5A and the articulated arm 16 picking up a clean vacuum press die 22 from the die cleaning station 38. Once the cleaning fluid supply head is coupled to the vacuum press die 22 to be cleaned, pressurized cleaning fluid is supplied via a cleaning fluid supply hose 74 to the interior of the vacuum press die 22 and is forcibly ejected through the perforations in the perforated top surface 23*a* of the vacuum press die 22 and into the cleaning basin where it is returned via a cleaning fluid return 62 to a settling tank (not shown). The cleaning fluid used is dependent on the adhesive(s) used to bind the laminae into the contoured article 94. Heated water mixed with a surfactant is adequate in many instances. The cleaning fluid is drawn from the settling tank through particle filters and pumped to a fluid heater, if required, at the pressure required to clean the vacuum press dies 22. The cleaning cycle may last as long as required to clean the vacuum press die 22, which may be determined, for example, by measuring a backpressure of cleaning fluid pumped through the cleaning fluid hose supply 74.

Figure 5C:
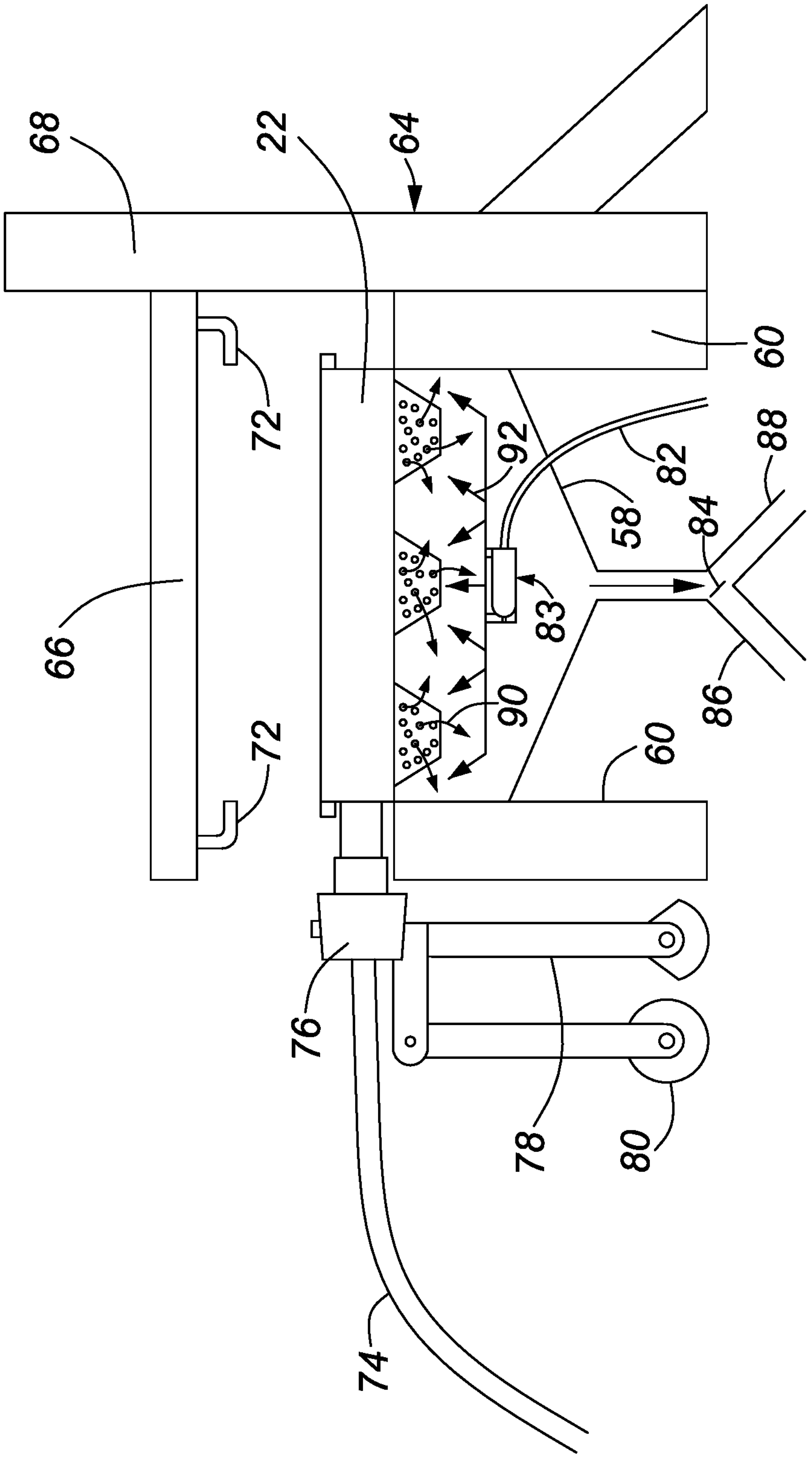
FIG. 5C is a schematic side view partially in cross-section of another embodiment of the cleaning station shown in FIG. 5A cleaning the vacuum press die placed on the cleaning station.

FIG. 5C is a schematic side view partially in cross-section of another embodiment of the cleaning station shown in FIG.

5A, cleaning the vacuum press die placed on the cleaning station shown. This embodiment of the die cleaning station 38 may be used for cleaning vacuum press dies 22 that are used to produce contoured articles using adhesives that may adhere to release-agent-coated press surfaces. This embodiment is identical to the embodiments shown in FIGS. 5A and 5B except that an external fluid supply 82 is connected to external fluid spray bars 83 to selectively deliver heated cleaning fluid or release agent 92 to the perforated top surface of the vacuum press die 22 while and/or after cleaning fluid 90 is pumped through the interior of the vacuum press die 22. A settling tank selector valve 84 is controlled to return cleaning fluid to a return cleaning fluid line 86 or a return release agent line 88. After cleaning of the perforations and the perforated top surface 23*a* of the vacuum press die 22 is determined to be complete, a fluid release agent may be applied to the perforated top surface 23*a* of the vacuum press die 22 to further inhibit adhesion of adhesive(s). In that case, the settling tank selector valve is moved to select the return release agent line 88 and release agent is pumped through the external fluid supply 82 to the external fluid spray bars 83 for a brief period while excess fluid release agent is returned to a release agent settling tank.

Figure 6:
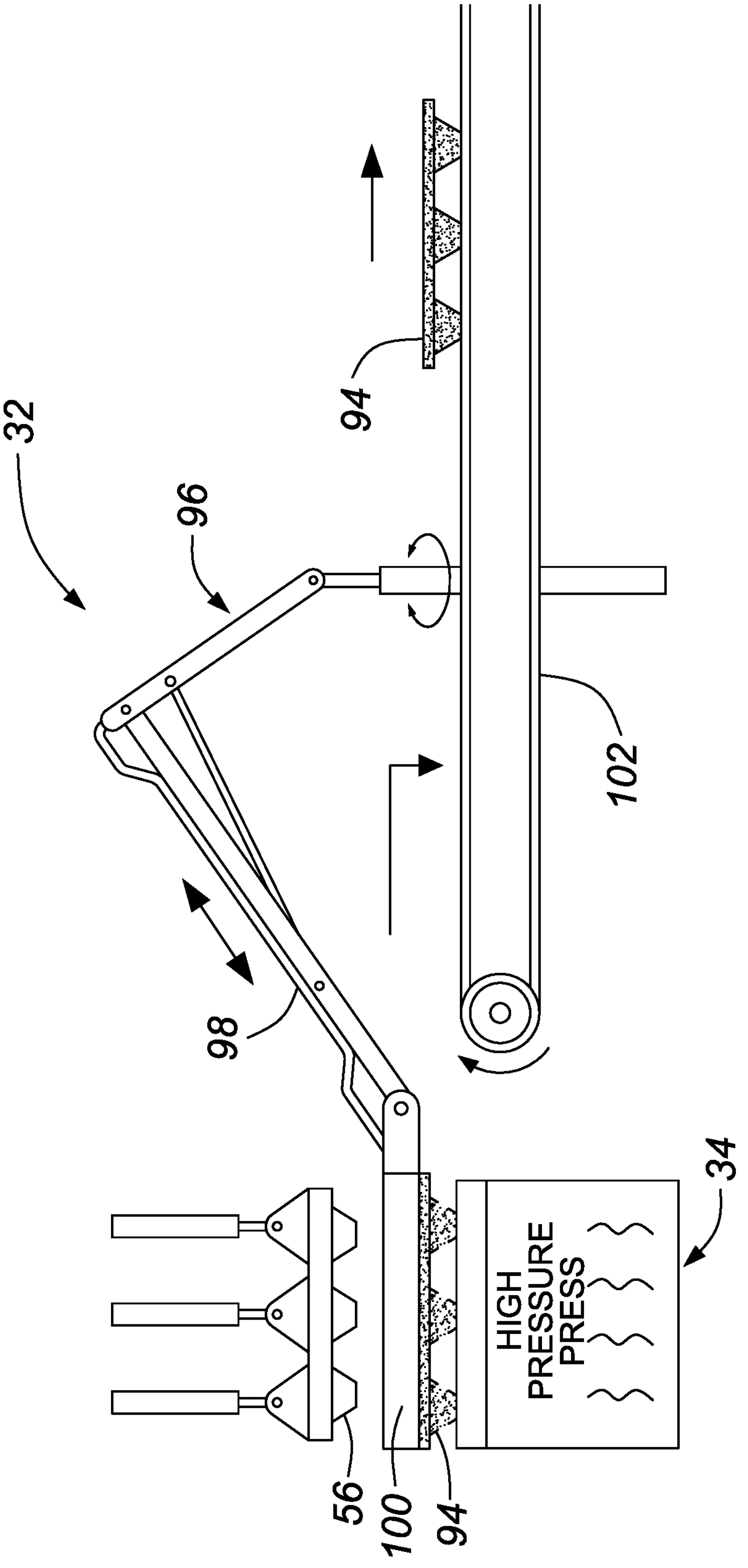
FIG. 6 is a schematic side view of an exemplary off-take station in accordance with one embodiment of the invention.

FIG. 6 is a schematic side view of an exemplary off-take and finish processing 36 in accordance with one embodiment of the invention. In this embodiment an articulated off-take arm 96 manipulates an off-take head 100 adapted to remove a contoured article 94 from the high-pressure press 34 and place the contoured article 94 on an off-take conveyor 102. In one embodiment, the articulated off-take arm 96 is equipped with a vacuum line 98 connected to the vacuum source 21*a*. The vacuum line is in fluid communication with the off-take head 100 and generates suction at intervals required to lift the contoured article 94 out of the high-pressure press and place it on the off-take conveyor 102, which delivers the contoured article 94 to contoured article finishing, storage and/or shipping.

As will be understood by those skilled in the art, implementation of the precise control of the central robot arm 12 described in general terms above is beyond the scope of the description of this invention and not discussed herein. As also understood by those skilled in the art, the software-controlled robot arm 12 may continuously read from sensors such as motor encoders, force sensors, or vision and depth sensors to update actuator commands to manipulate the vacuum press die 22 with the degree of precision required to implement the invention. Several suitable robot arm control systems are known in the art.

As will be further understood by persons skilled in the art, although the invention has been described showing the vacuum press die 22 in an inverted orientation during compression of the laminae mat 30 by the low-pressure press 32, the vacuum press die 22 may be rotated back to the non-inverted orientation after the excess laminae have been dumped from the top surface 23*a* and the laminae mat 30 may be compressed into the cohesive article 35 with the vacuum press die 22 in the non-inverted orientation in the low-pressure press 32.

As will be yet further understood by those skilled in the art, the modular vacuum press in accordance with the invention may also be used to manufacture articles made of shredded paper, chopped straw, hemp hurd, or any other flexible fibrous material that is relatively free of fines and compatible with heat-set polymer adhesives.

The embodiments of the invention described and illustrated are intended to be exemplary only. The scope of the invention is therefore intended to be limited solely by the scope of the appended claims.

PARTS LIST

| | |
|---|---|
| 10 | Modular vacuum press |
| 12 | Central robot arm |
| 14 | Robot arm pedestal |
| 16 | Articulated arm |
| 18 | Die coupling |
| 20 | Vacuum/air-pressure supply hose |
| 21a | Vacuum source |
| 21b | Air pressure source |
| 21c | 3-way valve |
| 22 | Vacuum press die |
| 23a | Perforated top surface |
| 23b | Solid bottom surface |
| 24 | Laminae loading station |
| 26 | Laminae inflow |
| 28 | Laminae return flow |
| 30 | Laminae mat |
| 32 | Low-pressure press |
| 34 | High-pressure press |
| 35 | Cohesive article |
| 36 | Off-take and finish processing |
| 38 | Die cleaning station |
| 40 | Laminae supply conveyor |
| 42 | Oscillating laminae distributor chute |
| 44 | Distributor chute pivot drive |
| 46 | Distributor hood |
| 48 | Return flow hood |
| 50 | Laminae return conveyor |
| 52 | Low-pressure press heat source |
| 54 | High-pressure press heat source |
| 56 | High-pressure press male press section |
| 57a | Vent passage |
| 57b | Vent passage |
| 58 | Cleaning basin |
| 60 | Cleaning basin support legs |
| 62 | Cleaning fluid return |
| 64 | Clean die storage rack |
| 66 | Clean die support arm |
| 68 | Clean die lift drive |
| 70 | Clean die grippers |
| 72 | Clean die gripper drives |
| 74 | Cleaning fluid supply hose |
| 76 | Cleaning fluid supply head |
| 78 | Cleaning fluid supply decoupler |
| 80 | Cleaning fluid supply decoupler drive |
| 82 | External fluid supply |
| 83 | External fluid spray bars |
| 84 | Settling tank selector valve |
| 86 | Return cleaning fluid line |
| 88 | Return release agent line |
| 90 | Cleaning fluid |
| 92 | Cleaning fluid/release agent |
| 94 | Contoured article |
| 96 | Articulated off-take arm |
| 98 | Vacuum line |
| 100 | Off-take head |
| 102 | Off-take conveyor |

I claim:

1. A modular vacuum press for producing contoured articles using wood laminae, comprising:

a central robot arm coupled to a vacuum press die and adapted to control a vacuum source to selectively generate a suction force at a perforated top surface of the vacuum press die;

a laminae loading station adapted to deposit a predetermined volume of wood laminae mixed with at least one adhesive on the perforated top surface of the vacuum press die to form a laminae mat adhered to the top surface of the vacuum press die by the suction force;

a heated low-pressure press adapted to receive the vacuum press die coupled to the robot arm, and to press the vacuum press die and the laminae mat to heat and compress the laminae mat to produce a cohesive article during a low-pressure press cycle; and a heated high-pressure press adapted to receive the cohesive article released by the robot arm from the vacuum press die, and to heat and compress the cohesive article to produce a permanently bonded contoured article during a high-pressure press cycle.

2. The modular vacuum press as claimed in claim 1 wherein the high-pressure press has a male press section that has a same shape and configuration as the top surface of the vacuum press die.

3. The modular vacuum press as claimed in claim 1 further comprising off-take and finish processing for removing the contoured article from the high-pressure press after the high-pressure press cycle.

4. The modular vacuum press as claimed in claim 3 wherein the off-take and finish processing comprises:

an articulated off-take arm adapted to support an off-take head in fluid communication with a vacuum line connected to the vacuum source; and an off-take conveyor adapted to convey contoured articles removed from the high-pressure press by the articulated off-take arm using the off-take head to one of contoured article finishing, packaging, or shipping.

5. The modular vacuum press as claimed in claim 1 further comprising a die cleaning station for periodically cleaning the perforated top surface of the vacuum press die of adhesive residue.

6. The modular vacuum press as claimed in claim 5 wherein the die cleaning station comprises:

a cleaning basin having a top surface adapted to support the vacuum press die;

cleaning basin support legs adapted to support the cleaning basin;

a clean die storage rack adapted to support a cleaned vacuum press die;

a cleaning fluid supply head adapted to couple to the vacuum press die to supply cleaning fluid to an interior of the vacuum press die;

a cleaning fluid supply hose connected to the cleaning fluid supply head; and a cleaning fluid return adapted to drain cleaning fluid from the cleaning fluid basin.

7. The modular vacuum press as claimed in claim 6 wherein the clean die storage rack comprises:

at least one clean die support arm adapted to support a clean vacuum press die;

a clean die lift drive adapted to move the clean die support arm from a clean die pick-up position to a clean die storage position;

clean die grippers associated with the clean die support arm and adapted to grip and support the clean vacuum press die; and clean die gripper drives adapted to move the clean die grippers from a clean die gripping position to a clean die release position.

8. The modular vacuum press as claimed in claim 1 wherein the laminae loading station comprises:

a laminae supply conveyor adapted to supply wood laminae from a wood laminae source;

an oscillating distributor chute adapted to distribute the wood laminae across the perforated top surface of the vacuum press die;

a distributor hood adapted to direct the wood laminae onto the perforated top surface of the vacuum press die; and a return flow hood adapted to direct wood laminae that bypass the vacuum press die onto a laminae return conveyor.

9. A modular vacuum press for producing contoured articles using wood laminae mixed with at least one adhesive, comprising:

a central robot arm having a die coupling and adapted to selectively couple the die coupling to a vacuum press die having a perforated top surface, and further adapted to control a vacuum source for generating a suction force at the perforated top surface of the vacuum press die;

a laminae loading station adapted to load a predetermined volume of the wood laminae on the perforated top surface of the vacuum press die to form a laminae mat when the central robot arm moves the vacuum press die to the laminae loading station and controls the vacuum source to generate the suction force at the perforated top surface of the vacuum press die;

a heated low-pressure press adapted to receive the vacuum press die coupled to the central robot arm and to compress the laminae mat to produce a cohesive article during a low-pressure press cycle; and a heated high-pressure press adapted to receive the cohesive article released by the central robot arm from the vacuum press die and to heat and compress the cohesive article to produce a permanently bonded contoured article during a high-pressure press cycle.

10. The modular vacuum press as claimed in claim 9 wherein the heated high-pressure press has a male press section with a male press surface having a same shape and configuration as the top surface of the vacuum press die.

11. The modular vacuum press as claimed in claim 9 wherein the laminae loading station comprises:

a laminae supply conveyor adapted to deliver the laminae from a laminae source to the laminae loading station;

an oscillating laminae distributor chute adapted to receive the laminae dropped from the laminae supply conveyor and distribute the laminae over the perforated top surface of the vacuum press die;

a distributor hood adapted to contain and direct the laminae distributed by the oscillating laminae distributor chute onto the perforated top surface of the vacuum press die;

a laminae return conveyor adapted to return laminae that bypass the vacuum press die; and a return flow hood adapted to direct the laminae that bypass the vacuum press die onto the return flow conveyor.

12. The modular vacuum press as claimed in claim 9 further comprising a die cleaning station adapted to clean the vacuum press die if perforations in the perforated top surface are occluded by adhesive residue.

13. The modular vacuum press as claimed in claim 12 wherein the die cleaning station comprises a die cleaning basin and a clean die storage rack.

14. The modular vacuum press as claimed in claim 13 wherein the die cleaning basin has a top surface adapted to support a vacuum press die to be cleaned, and a cleaning fluid head adapted to connect to the vacuum press die in fluid communication with an interior of the vacuum press die.

15. The modular vacuum press as claimed in claim 13 wherein the clean die storage rack comprises at least one clean die support arm having clean die grippers adapted to grip and support a vacuum press die cleaned by the die cleaning basin.

16. The modular vacuum press as claimed in claim 9 further comprising off-take and finish processing adapted to remove contoured articles from the high-pressure press.

* * * * *